US007003533B2

(12) United States Patent
Noguchi et al.

(10) Patent No.: US 7,003,533 B2
(45) Date of Patent: Feb. 21, 2006

(54) FILE MANAGEMENT METHOD, CONTENT RECORDING/PLAYBACK APPARATUS AND CONTENT RECORDING PROGRAM

(75) Inventors: Naohiko Noguchi, Yokohama (JP);
Hiroyuki Suzuki, Kawasaki (JP);
Mitsuhiro Sato, Atsugi (JP); Takashi Shimojima, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 460 days.

(21) Appl. No.: 10/004,813

(22) Filed: Dec. 7, 2001

(65) Prior Publication Data

US 2002/0073105 A1 Jun. 13, 2002

(30) Foreign Application Priority Data

Dec. 12, 2000 (JP) .............................. 2000-377605

(51) Int. Cl.
G06F 12/00 (2006.01)
(52) U.S. Cl. .......................................... 707/203; 707/2
(58) Field of Classification Search ................ 707/200, 707/201, 202, 203, 1, 2, 10; 709/217, 219
See application file for complete search history.

(56) References Cited

U.S. PATENT DOCUMENTS

| 5,008,820 | A |   | 4/1991  | Christopher, Jr. et al. |         |
|-----------|---|---|---------|-------------------------|---------|
| 5,721,919 | A | * | 2/1998  | Morel et al.            | 707/203 |
| 5,742,817 | A | * | 4/1998  | Pinkoski                | 707/200 |
| 5,761,677 | A | * | 6/1998  | Senator et al.          | 707/203 |
| 5,765,165 | A | * | 6/1998  | Harper                  | 707/200 |
| 5,793,966 | A | * | 8/1998  | Amstein et al.          | 709/203 |
| 5,991,798 | A | * | 11/1999 | Ozaki et al.            | 709/217 |
| 6,049,799 | A | * | 4/2000  | Mangat et al.           | 707/10  |
| 6,151,624 | A | * | 11/2000 | Teare et al.            | 709/217 |
| 6,182,158 | B1 | * | 1/2001  | Kougiouris et al.      | 719/328 |
| 6,289,356 | B1 | * | 9/2001  | Hitz et al.             | 707/201 |
| 6,401,097 | B1 | * | 6/2002  | McCotter et al.         | 707/102 |
| 6,442,573 | B1 | * | 8/2002  | Schiller et al.         | 715/500.1 |
| 6,493,804 | B1 | * | 12/2002 | Soltis et al.           | 711/152 |
| 6,567,811 | B1 | * | 5/2003  | Edwards et al.          | 707/100 |
| 6,578,078 | B1 | * | 6/2003  | Smith et al.            | 709/224 |
| 6,609,123 | B1 | * | 8/2003  | Cazemier et al.         | 707/4   |
| 6,611,862 | B1 | * | 8/2003  | Reisman                 | 709/217 |

(Continued)

FOREIGN PATENT DOCUMENTS

CN          88100793          10/1988

(Continued)

OTHER PUBLICATIONS

English Language Abstract of KR 1999-38731.

(Continued)

Primary Examiner—Safet Metjahic
Assistant Examiner—Brian Goddard
(74) Attorney, Agent, or Firm—Greenblum & Bernstein, P.L.C.

(57) ABSTRACT

A package management information recording section 131 creates and records on a recording medium 120 package management information for managing packages recorded on the recording medium 120. A content file recording section 132 records on the recording medium 120 content files of content file groups included in packages, and also creates and records on the recording medium 120 content file group management information for managing these content file groups. A content/metadata correspondence information recording section 133 creates and records on the recording medium 120 information on correspondence between content files and metadata files within a package or correspondence between a package itself and metadata files. By this means, the correspondence between content files and metadata files can always be maintained correctly when they are recorded separately.

6 Claims, 16 Drawing Sheets

U.S. PATENT DOCUMENTS

| | | | |
|---|---|---|---|
| 6,662,188 B1 * | 12/2003 | Rasmussen et al. | 707/102 |
| 6,684,387 B1 * | 1/2004 | Acker et al. | 717/126 |
| 6,714,949 B1 * | 3/2004 | Frey, Jr. | 707/200 |
| 2003/0028686 A1 * | 2/2003 | Schwabe et al. | 709/332 |

FOREIGN PATENT DOCUMENTS

| | | |
|---|---|---|
| CN | 1230063 | 9/1999 |
| CN | 1243291 | 2/2000 |
| JP | 10-143422 | 5/1998 |
| JP | 10143422 | 5/1998 |
| KR | 1999-38731 | 6/1999 |

OTHER PUBLICATIONS

English Language Abstract of CN 1230063.

Z. Zhixiong, "Metadata: Data Organizing and Finding the Internet Resource", pp. 21-25, 1999, with an English language Abstract of the same.

* cited by examiner

12240025.mdt

| DATE | KEYWORDS | CATEGORY | TITLE |
|---|---|---|---|
| 20001224 | CHRISTMAS, DEPARTMENT, STORE, SALES | SOCIAL | YEAR-END BUSINESS COMPETITION IN FULL SWING |

12240026.mdt

| DATE | KEYWORDS | CATEGORY | TITLE |
|---|---|---|---|
| 20001224 | A ELECTRIC, SEMICONDUCTOR, EQUIPMENT | INDUSTRIAL | A ELECTRIC'S, SEMICONDUCTOR INVESTMENT REVISED UPWARD |

12240000.mdt

| DATE | AUTHOR | REPRODUCTION | PRINTING |
|---|---|---|---|
| 20001224 | NEWSPAPER A | NO | OK |

FIG.3

PACKAGE MANAGEMENT FILE

| PACKAGE DIRECTORY NUMBER | PACKAGE IDENTIFIER |
|---|---|
| 00001 | ARTICLE001224 |

FIG.5

CONTENT FILE GROUP MANAGEMENT FILE

| FILE NUMBER | FILE IDENTIFIER |
|---|---|
| 00001 | 12240025.htm |
| 00002 | 12240026.htm |
| 00003 | 12240025.mdt |
| 00004 | 12240026.mdt |
| 00005 | 12240000.mdt |

FIG.6

CONTENT/METADATA CORRESPONDENCE MANAGEMENT FILE

| METADATA FILE IDENTIFIER | IDENTIFIER |
|---|---|
| 12240025.mdt | 12240025.htm |
| 12240026.mdt | 12240026.htm |
| 12240000.mdt | ARTICLE001224 |

FIG.7

| 00003 | | |
|---|---|---|
| DATE | KEYWORDS | CATEGORY | TITLE |
| 20001224 | CHRISTMAS, DEPARTMENT, STORE, SALES | SOCIAL | YEAR-END BUSINESS COMPETITION IN FULL SWING |

| 00004 | | |
|---|---|---|
| DATE | KEYWORDS | CATEGORY | TITLE |
| 20001224 | A ELECTRIC, SEMICONDUCTOR, EQUIPMENT | INDUSTRIAL | A ELECTRIC'S, SEMICONDUCTOR INVESTMENT REVISED UPWARD |

FIG.8

```
LIST OF ARTICLES

......
12/24/2000 YEAR-END BUSINESS COMPETITION IN FULL SWING
12/24/2000 A ELECTRIC'S SEMICONDUCTOR INVESTMENT REVISED UPWARD
......
```

SERVICE MANAGEMENT FILE

| SERVICE DIRECTORY NUMBER | SERVICE IDENTIFIER |
|---|---|
| 00001 | COMPREPORT |

FIG.14

METADATA FILE GROUP MANAGEMENT FILE

| METADATA FILE NUMBER | IDENTIFIER |
|---|---|
| 00001 | CATEGORY.mdt |
| 00002 | ACOMP00.mdt |
| 00003 | BCOMP00.mdt |
| 00004 | CCOMP00.mdt |
| 00005 | DCOMP00.mdt |
| 00006 | BCOMP01.mdt |
| 00007 | ECOMP00.mdt |
| 00008 | DCOMP10.mdt |
| 00009 | FCOMP00.mdt |
| 00010 | CCOMP10.mdt |
| 00011 | GCOMP00.mdt |
| 00012 | CONSUME.mdt |
| 00013 | ELECTRIC.mdt |
| 00014 | COMPUTE.mdt |

FIG.15

| MAIN CATEGORY | SUBCATEGORY | BASE CATEGORY |
|---|---|---|
| MANUFACTURING | ELECTRICAL | COMPUTER |
| | | HEAVY ELECTRICAL |
| | | CONSUMER ELECTRONICS |
| | AUTOMOTIVE | |
| | PARTS | |
| SERVICES | | |
| FINANCIAL | | |
| CONSTRUCTION | | |

| DATE | COMPANY NAME | CATEGORY | BUSINESS RESULTS |
|---|---|---|---|
| 20001224 | A CORP. | MANUFACTURING, ELECTRICAL, HEAVY ELECTRICAL, CONSUMER ELECTRONICS | − |

1102

| DATE | COMPANY NAME | CATEGORY | BUSINESS RESULTS |
|---|---|---|---|
| 20001224 | B CORP. | MANUFACTURING, ELECTRICAL, COMPUTER | + |

1103

| DATE | COMPANY NAME | CATEGORY | BUSINESS RESULTS |
|---|---|---|---|
| 20001224 | C CORP. | MANUFACTURING, ELECTRICAL, CONSUMER ELECTRONICS | + |

1104

| DATE | COMPANY NAME | CATEGORY | BUSINESS RESULTS |
|---|---|---|---|
| 20001224 | D CORP. | MANUFACTURING, ELECTRICAL, HEAVY ELECTRICAL | + |

1105

| DATE | COMPANY NAME | CATEGORY | BUSINESS RESULTS |
|---|---|---|---|
| 20010321 | B CORP. | MANUFACTURING, ELECTRICAL, COMPUTER | − |

1106

| DATE | COMPANY NAME | CATEGORY | BUSINESS RESULTS |
|---|---|---|---|
| 20001224 | E CORP. | MANUFACTURING, ELECTRICAL, COMPUTER, CONSUMER ELECTRONICS | + |

1107

| DATE | COMPANY NAME | CATEGORY | BUSINESS RESULTS |
|---|---|---|---|
| 20010322 | D CORP. | MANUFACTURING, ELECTRICAL, HEAVY ELECTRICAL | − |

1108

| DATE | COMPANY NAME | CATEGORY | BUSINESS RESULTS |
|---|---|---|---|
| 20001224 | F CORP. | MANUFACTURING, ELECTRICAL, HEAVY ELECTRICAL, COMPUTER | − |

1109

| DATE | COMPANY NAME | CATEGORY | BUSINESS RESULTS |
|---|---|---|---|
| 20010322 | C CORP. | MANUFACTURING, ELECTRICAL, CONSUMER ELECTRONICS | + |

1110

| DATE | COMPANY NAME | CATEGORY | BUSINESS RESULTS |
|---|---|---|---|
| 20001224 | G CORP. | MANUFACTURING, ELECTRICAL, HEAVY ELECTRICAL, CONSUMER ELECTRONICS, COMPUTER | + |

| CATEGORY | BUSINESS RESULTS SUMMARY | |
|---|---|---|
| | + | - |
| MANUFACTURING/ ELECTRICAL/ CONSUMER ELECTRONICS | 4 | 1 |

1207

| CATEGORY | BUSINESS RESULTS SUMMARY | |
|---|---|---|
| | + | - |
| MANUFACTURING/ ELECTRICAL/ HEAVY ELECTRICAL | 2 | 3 |

1208

| CATEGORY | BUSINESS RESULTS SUMMARY | |
|---|---|---|
| | + | - |
| MANUFACTURING/ ELECTRICAL/ COMPUTER | 3 | 2 |

| METADATA FILE IDENTIFIER | IDENTIFIER |
|---|---|
| CATEGORY.mdt | COMPREPORT |
| ACOMP00.mdt | ACOMPPACK00 |
| BCOMP00.mdt | BCOMPPACK00 |
| CCOMP00.mdt | CCOMPPACK00 |
| DCOMP00.mdt | DCOMPPACK00 |
| BCOMP10.mdt | BCOMPPACK01 |
| ECOMP00.mdt | ECOMPPACK00 |
| DCOMP10.mdt | DCOMPPACK01 |
| FCOMP00.mdt | FCOMPPACK00 |
| CCOMP10.mdt | CCOMPPACK01 |
| GCOMP00.mdt | GCOMPPACK00 |
| CONSUME.mdt | ACOMPPACK00 |
| | CCOMPPACK00 |
| | CCOMPPACK01 |
| | ECOMPPACK00 |
| | GCOMPPACK00 |
| ELECTRIC.mdt | ACOMPPACK00 |
| | DCOMPPACK00 |
| | DCOMPPACK01 |
| | FCOMPPACK00 |
| | GCOMPPACK00 |
| COMPUTE.mdt | BCOMPPACK00 |
| | BCOMPPACK01 |
| | ECOMPPACK00 |
| | FCOMPPACK00 |
| | GCOMPPACK00 |

FIG.19

| PACKAGE DIRECTORY NUMBER | PACKAGE IDENTIFIER |
|---|---|
| 00001 | ACOMPPACK00 |
| 00002 | BCOMPPACK00 |
| 00003 | CCOMPPACK00 |
| 00004 | DCOMPPACK00 |
| 00005 | BCOMPPACK01 |
| 00006 | ECOMPPACK00 |
| 00007 | DCOMPPACK01 |
| 00008 | FCOMPPACK00 |
| 00009 | CCOMPPACK01 |
| 00010 | GCOMPPACK00 |

FIG.20

METADATA CORRESPONDENCE MANAGEMENT FILE CONTENTS

| RECORD TYPE | METADATA FILE IDENTIFIER | OBJECT IDENTIFIER |
|---|---|---|
| 21 | 12240025.mdt | 12240025.htm |
| 21 | 12240026.mdt | 12240026.htm |
| 22 | 12240000.mdt | ARTICLE001224 |

FIG.21

RECORD TYPE VALUES AND MEANINGS

| RECORD TYPE | MEANING |
|---|---|
| 11 | RELEVANT METADATA CORRESPONDENCE MANAGEMENT FILE IS LOCATED DIRECTLY UNDER SERVICE DIRECTORY. METADATA CORRESPONDING TO PACKAGE. |
| 12 | RELEVANT METADATA CORRESPONDENCE MANAGEMENT FILE IS LOCATED DIRECTLY UNDER SERVICE DIRECTORY. METADATA CORRESPONDING TO SERVICE. |
| 21 | RELEVANT METADATA CORRESPONDENCE MANAGEMENT FILE IS LOCATED DIRECTLY UNDER PACKAGE DIRECTORY. METADATA CORRESPONDING TO CONTENT. |
| 22 | RELEVANT METADATA CORRESPONDENCE MANAGEMENT FILE IS LOCATED DIRECTLY UNDER PACKAGE DIRECTORY. METADATA CORRESPONDING TO PACKAGE. |

FIG.22

FILE MANAGEMENT METHOD, CONTENT RECORDING/PLAYBACK APPARATUS AND CONTENT RECORDING PROGRAM

BACKGROUND OF THE INVENTION

1. Field of the Invention

The present invention relates to a file management method for maintaining correspondence between a content file stored on a recording medium and an associated metadata file, a content recording/playback apparatus that implements this file management method, and a content recording program on which this file management method is recorded.

2. Description of the Related Art

Demand continues to grow for digital content distribution services that employ communications and broadcasting.

For example, a newspaper article distribution service has been conceived of whereby newspaper articles are downloaded each morning to a mobile phone and recorded onto a recording medium connected to that mobile phone, and an article can be read when wished by connecting that recording medium to another device such as a television set, portable display, portable personal organizer, or the like.

Also, an electronic book service has been conceived of whereby a novel is divided into chapters, and charging/downloading is performed chapter by chapter.

(Storage Package by Package)

As a concrete example of a newspaper article distribution service, a method can be considered whereby newspaper articles are written as HTML format files, and one day's worth of HTML files and image files or audio files accompanying those HTML files are distributed as a single package. With a service that distributes related contents as a single package in this way, a directory is generally created package by package for distributed content, and is recorded on a recording medium.

(Storage Service by Service)

Also, the capacity of recording media for downloading content is increasing at a rapid pace, and it has become possible for a large number of distribution services to be received on a single recording medium.

In this case, distributed content from a plurality of services coexists on a single recording medium, and generally a directory is created for each service on the recording medium and distributed content is recorded under the directory for the corresponding service.

(Provision of Metadata)

Moreover, in a content distribution service, information generally called metadata, comprising content related bibliographic matter, management information, attribute information, and so forth, is also distributed apart from the content, and recorded on the recording medium. In an apparatus that actually plays back/displays content, it is possible to perform operations other than playback/display, such as content searching or categorizing and organizing, by using the metadata accompanying that content.

(Metadata Recording Methods)

There are two methods for recording this kind of metadata on a recording medium: the case where the interior of a content file is constructed and metadata is also recorded by being stored in the same file as a part thereof, and the case where a metadata file is created separately from the content file, and metadata is recorded in individual files.

In an apparatus that receives content distribution, there are cases where original file names are assigned to a distributed content file and metadata file in order to enable efficient content recording and playback by means of simple processing.

For this reason, with the method, of the conventional metadata recording methods, whereby content and metadata are recorded in separate files, if, when a distributed content file and its metadata file are recorded on a recording medium of a receiving apparatus, original file names are assigned to these files on the receiving side, it becomes impossible to interpret the correspondence between them by means of the distribution-time file names.

On the other hand, with the method whereby metadata is recorded as part of a content file, the above problem does not occur, but metadata corresponds only to an individual content file, and it is difficult to write various kinds of metadata—such as metadata relating to a collection of a plurality of content files, metadata relating to an entire package, and metadata relating to an entire service—in a flexible manner.

Also, when performing processing using only metadata, such as searching, categorizing, listing, and so forth, it is necessary to acquire the contents of each content file, leading to problems in terms of processing efficiency.

SUMMARY OF THE INVENTION

It is an object of the present invention to provide a file management method that enables the relevant correspondence to be maintained when an object such as a content file and a metadata file are recorded separately, and also to provide a content recording/playback apparatus for implementing this method and a content recording program on which this file management method is recorded.

The present invention achieves the above object by managing the correspondence between a metadata file identifier and an object identifier with a metadata correspondence management file when managing a distributed object and metadata file recorded on a recording medium.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a drawing showing an example of the contents of metadata contained in a package;

FIG. 5 is a drawing showing a package management file of Embodiment 1;

FIG. 6 is a drawing showing a content file group management file of Embodiment 1;

FIG. 7 is a drawing showing a content data correspondence management file of Embodiment 1;

FIG. 8 is a drawing showing examples of description contents of metadata files of Embodiment 1;

FIG. 14 is a drawing showing a service management file of Embodiment 2;

FIG. 15 is a drawing showing a metadata file group management file of Embodiment 2;

FIG. 16 is a drawing showing an example of contents of metadata corresponding to a service of Embodiment 2;

FIG. 17 is a drawing showing contents of various metadata of Embodiment 2;

FIG. 18 is a sample description of contents of a metadata file of Embodiment 2;

FIG. 19 is a drawing showing a package/metadata correspondence management file of Embodiment 2;

FIG. 20 is a drawing showing a package management file of Embodiment 2;

FIG. 21 is a drawing showing an example of the contents of a metadata correspondence management file of Embodiment 2; and FIG. 22 is a drawing showing examples of record type values and their meanings.

DETAILED DESCRIPTION OF THE PREFERRED EMBODIMENTS

With reference now to the accompanying drawings, embodiments of the present invention will be explained in detail below. It should be understood that the present invention is in no way limited to these embodiments and may be implemented in a variety of modes without departing from the spirit and/or scope of the present invention.

(Embodiment 1)

Figure 1:
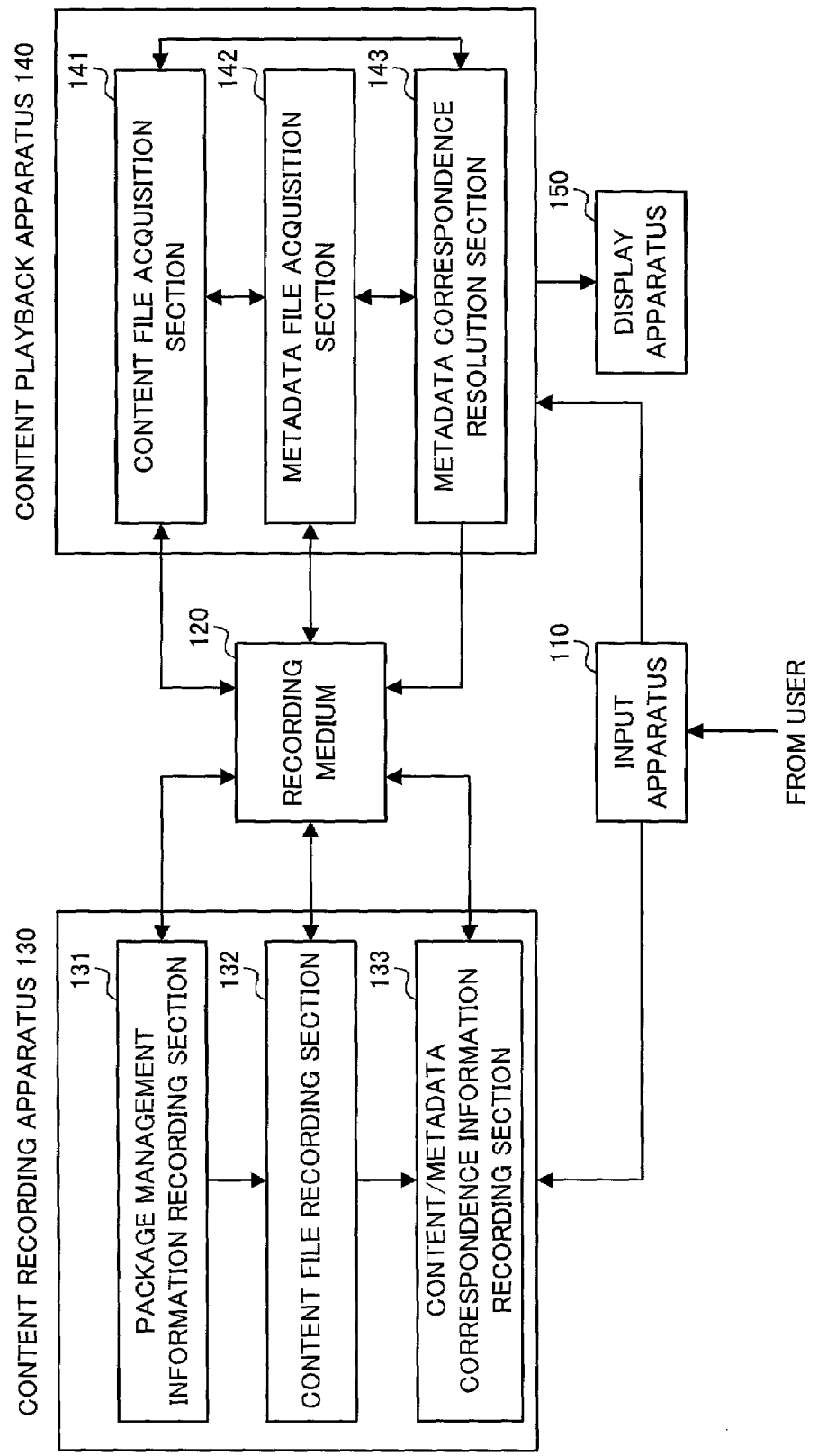
FIG. 1 is a block diagram showing the configuration of a content recording/playback apparatus in Embodiment 1.

FIG. 1 is a block diagram showing the configuration of a content recording/playback apparatus in Embodiment 1 of the present invention. This apparatus chiefly comprises an input apparatus 110, recording medium 120, content recording apparatus 130, content playback apparatus 140, and display apparatus 150. The input apparatus 110 inputs a content recording request from a user to the content recording apparatus 130, and inputs a content playback request or content search request from a user to the content playback apparatus 140. The content recording apparatus 130 records package-unit content, metadata, and file management information on the recording medium 120. Using content and metadata recorded on the recording medium 120, the content playback apparatus 140 plays back contents and displays them on the display apparatus 150, and performs content searching and categorizing.

The content recording apparatus 130 comprises a package management information recording section 131, content file recording section 132, and content/metadata correspondence information recording section 133. The package management information recording section 131 creates package management information for managing packages recorded on the recording medium 120 and records it on the recording medium 120. The content file recording section 132 records each content file of a content file group included in a package on the recording medium 120, and also creates content file group management information for managing these content file groups and records it on the recording medium 120. The content/metadata correspondence information recording section 133 creates information on correspondence between a content file and metadata file in a package, or correspondence between a package itself and a metadata file, and records it on the recording medium 120.

The content playback apparatus 140 comprises a content file acquisition section 141, metadata file acquisition section 142, and metadata correspondence resolution section 143. The content file acquisition section 141 receives a content playback command from the input apparatus 110, and acquires the specified file from the recording medium 120. The metadata file acquisition section 142 acquires a metadata file necessary for search processing from the recording medium 120. The metadata correspondence resolution section 143 performs acquisition of a metadata file corresponding to a specified content file and acquisition of a content file corresponding to a specified metadata file.

Next, content recording processing, content search processing, and content playback processing performed by this apparatus in this embodiment based on the file management method of this embodiment will be described using actual examples.

<Content Recording Processing>

First, a content recording command is received from the user via the input apparatus 110. Here, the case where a recording command for the package shown in FIG. 2 is issued will be considered as an example.

Figure 2:
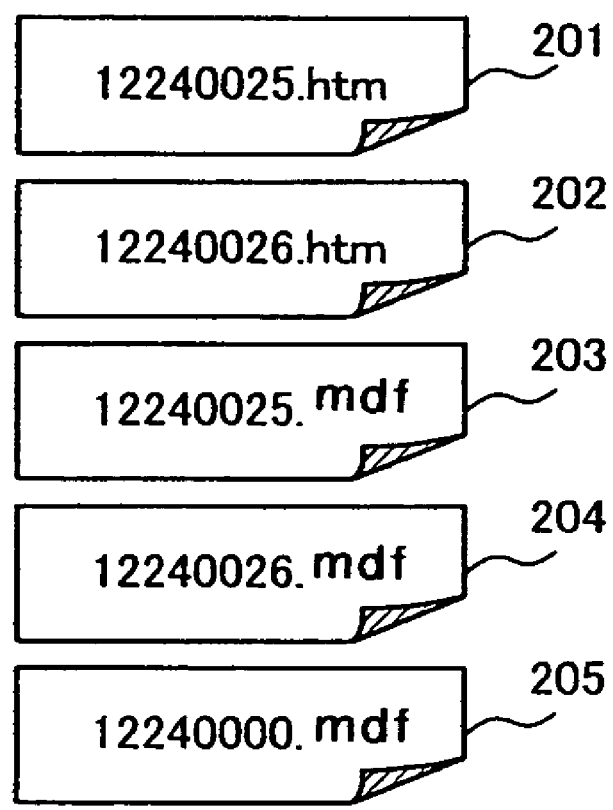
FIG. 2 is a drawing showing a package that contains content files and metadata files.

The package shown in FIG. 2 is composed of HTML files 201 and 202, metadata files 203 and 204 assigned to these, and a metadata file 205 relating to this entire package. FIG. 2 is a drawing illustrating part of a package, and many other such files exist within that package.

Distribution-time HTML files 201 and 202 have the file names "12240025.htm" and "12240026.htm" respectively, and metadata files 203, 204, and 205 have the file names "12240025.mdt", "12240026.mdt", and "12240000.mdt" so that their correspondence to the HTML files is clear. These file names are assigned based on distributing-side file management rules, and their uniqueness is subsequently maintained in the package distribution service.

In this case, these file names can be used as file identifiers.

FIG. 3 shows an example of the description contents of metadata files "12240025.mdt", "12240026.mdt", and "12240000.mdt" in FIG. 2. Files "12240025.mdt" and "12240026.mdt" contain information such as "Date", "Keywords", "Category", and "Title" for corresponding newspaper article content files "12240025.htm" and "12240026.htm" as metadata. "12240000.mdt" contains copyright related information indicating the author, possibility or otherwise of reproduction and printing, and so forth, as metadata relating to this entire package. Items written as metadata are not limited to these items, and many other items may be included.

Figure 4:
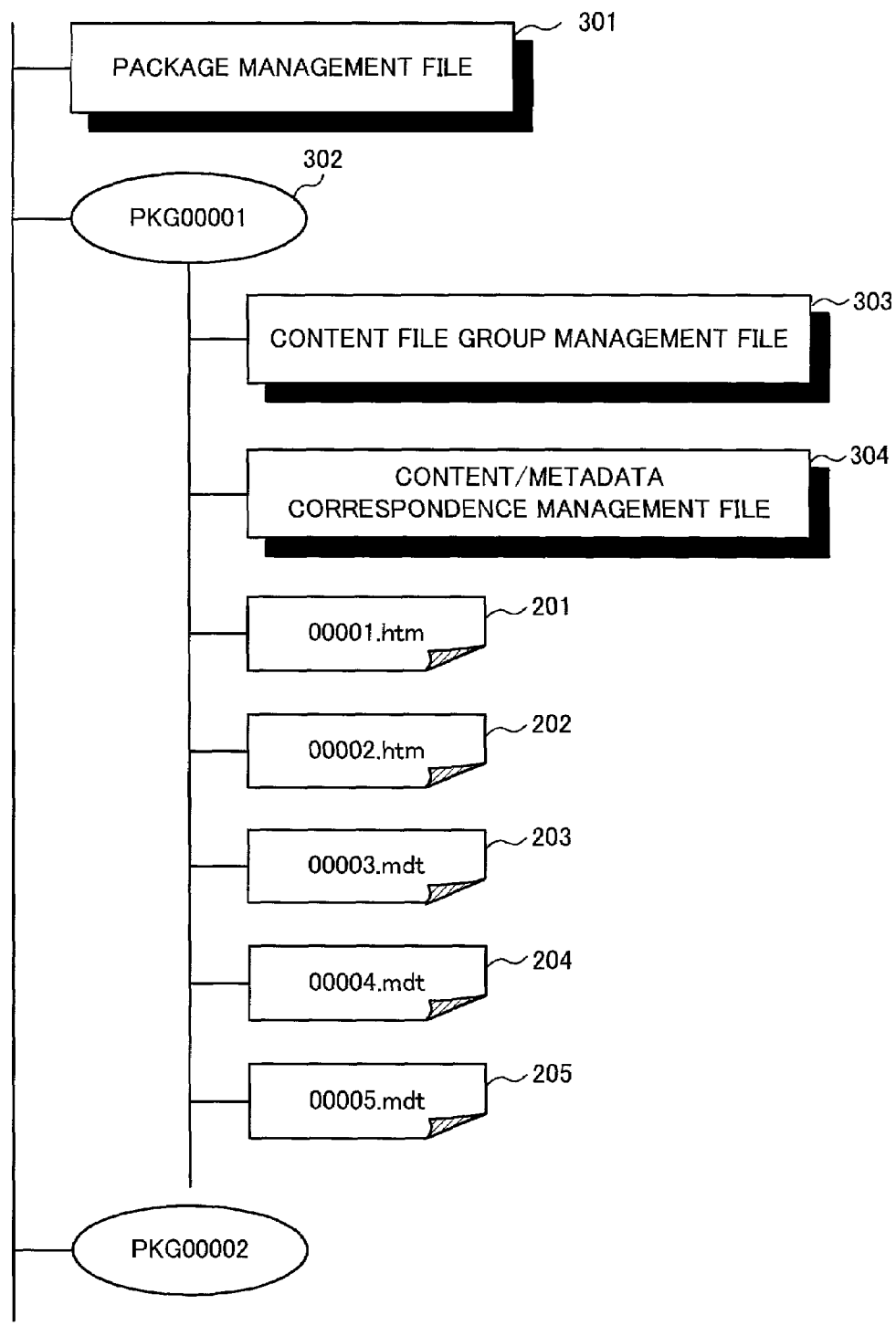
FIG. 4 is a drawing showing directory and file configuration on a recording medium of Embodiment 1.

FIG. 4 is a drawing showing an example of the directory and file configuration on the recording medium 120 when the package shown in FIG. 2 is recorded by the content recording apparatus 130.

A directory is created and recorded on the recording medium 120 for each package, and package management information is managed by a package management file 301. A directory 302 called "PKG00001" is created at the same level as the package management file 301, and below this directory 302 are stored a content file group management file 303 containing content file group and metadata file group management information, a content/metadata correspondence management file 304, and HTML files 201 and 202 and metadata files 203, 204, and 205 included in the package shown in FIG. 2.

HTML files 201 and 202 and metadata files 203, 204, and 205 included in the package shown in FIG. 2 are assumed to have been recorded under the file names "00001.htm", "00002.htm", "00003.mdt", "00004.mdt", and "00005.mdt" respectively, set originally by the content recording apparatus 130.

When the content recording apparatus 130 receives a content recording command from the input apparatus 110, it first creates or updates the package management file 301 by means of the package management information recording section 131.

FIG. 5 is a drawing showing an example of the package management file 301 at the stage at which the package shown in FIG. 2 is recorded on the recording medium 120. The package management file 301 manages the correspondence between a package directory number corresponding to the package directory name and a package identifier for uniquely identifying that directory.

In this embodiment, the description is based on a naming rule whereby the directory name of a package directory corresponding to a package directory number is designated "PKGXXXXX (XXXXX=package directory number)", as shown in FIG. 4. It should be understood that any naming rule may be used as long as it derives the directory name of a package directory uniquely from the package directory number.

Also, in FIG. 5, the string "ARTICLE001224" is used as a package identifier, but as long as this package identifier can uniquely identify a package directory existing on the recording medium 120, any kind of string, numerals, or symbols may be used.

Next, content file and metadata file recording and content file group management file creation are performed by the content file recording section 132.

FIG. 6 is a drawing showing an example of a content file group management file 303 at the stage at which the package shown in FIG. 2 is recorded on the recording medium 120. A content file group management file manages the correspondence between a file number corresponding to a file name when recorded on the recording medium 120 and a file identifier for uniquely identifying the relevant content file or metadata file, and one content file group management file is created for each package directory. File numbers are assigned on a package-by-package basis.

In this embodiment, the description is based on a naming rule whereby the file name corresponding to a file number is designated "XXXXX.EXT (XXXXX=file number, EXT=original file extension)", as shown in FIG. 4. It should be understood that any naming rule may be used as long as it derives the file name on the recording medium 120 uniquely from the file number.

Also, in FIG. 6, the distribution source file name string is used as a file identifier, but as long as this file identifier can uniquely identify a file existing under the relevant package directory "PKG00001" on the recording medium 120, any kind of string, numerals, or symbols may be used.

Lastly, the content/metadata correspondence information recording section 133 creates a content/metadata correspondence management file indicating the correspondence between a content file and metadata file or the correspondence between a package itself and a metadata file.

FIG. 7 is a drawing showing an example of a content/metadata correspondence management file 304 at the stage at which the package shown in FIG. 2 is recorded on the recording medium 120. A content/metadata correspondence management file manages the correspondence between a content file identifier and a metadata file identifier, or the correspondence between a package identifier and a metadata file identifier, and one content/metadata correspondence management file is created for each package directory.

This content/metadata correspondence management file records one-to-one relationships relating one content file identifier to metadata file identifiers "12240025.mdt" and "12240026.mdt", respectively, but it is also possible to record and manage a one-to-multiple relationship between one metadata file identifier and a plurality of content identifiers, a multiple-to-one relationship between a plurality of metadata file identifiers and one content identifier, or a multiple-to-multiple relationship between a plurality of metadata file identifiers and a plurality of content identifiers.

<Content Search and Playback Processing>

The case will be considered where there is a search request for the package shown in FIG. 2 via the input apparatus 110. Two cases are considered here: the case where a content list is displayed and the user then makes a selection therefrom as a search request, and the case where the user inputs a keyword and content matching that keyword is searched for.

First, processing will be described for the case where a content list is displayed and the user then makes a selection therefrom as a search request.

FIG. 8 is a drawing showing an example of description contents of metadata files "00003.mdt" and "00004.mdt". These files contain information such as "Date", "Keywords", "Category", and "Title" for the corresponding newspaper article content files as metadata.

The content playback apparatus 140 and metadata file acquisition section 142 acquire all metadata files recorded on the recording medium 120, and display "Title information" written in the metadata files as a list on the display apparatus 150. An example of the display contents of the display apparatus 150 at this time is shown in FIG. 9.

Figures 9, 10:
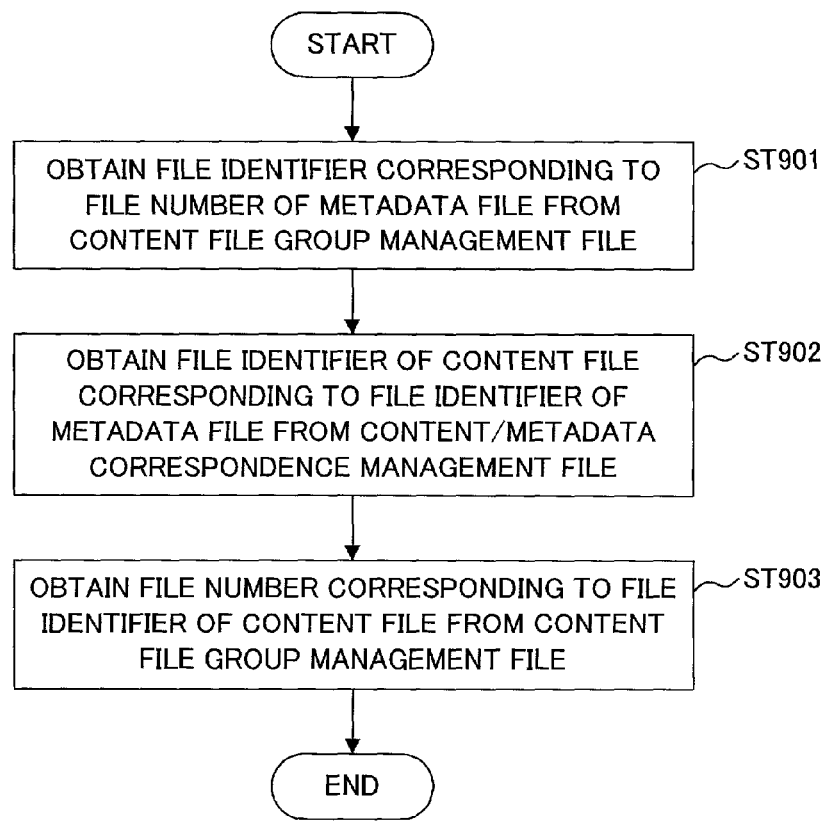
FIG. 9 is a drawing showing an example of a list display screen of Embodiment 1.
FIG. 10 is a flowchart showing the processing procedure of a metadata correspondence resolution section of Embodiment 1.

The user looks at the list in FIG. 9 and specifies the desired article. The content playback apparatus 140 holds the correspondence between listed article title information and the file number of the metadata file from which that information was acquired, and passes that file number to the metadata correspondence resolution section 143.

Processing in the metadata correspondence resolution section 143 will be described below for the case where the user selects the title display "Year-end business competition in full swing" from the list shown in FIG. 9. FIG. 10 shows the processing flow in the metadata correspondence resolution section 143.

Step 901: First, the file identifier corresponding to file number "00003" of the metadata file corresponding to the title "Year-end business competition in full swing" is acquired from the content file group management file 303. As shown in FIG. 6, identifier "12240025.mdt" is obtained as a result.

Step 902: Next, the identifier corresponding to metadata file identifier "12240025.mdt" is obtained from the content/metadata correspondence management file 304. As shown in FIG. 7, identifier "12240025.htm" is obtained as a result.

Step 903: Lastly, the content file number corresponding to file identifier "12240025.htm" is obtained from the content file group management file 303. As shown in FIG. 6, "00001" is obtained as a result.

Thus, file number "00001"—that is, file "0 001.htm" in FIG. 4—is obtained as the final result for the content file corresponding to the title "Year-end business competition in full swing".

The content file acquisition section 141 then acquires the contents of file "00001.htm" and outputs then to the display apparatus 150.

It is also possible for all the processing from Step 901 to Step 903 to be performed on metadata files before listing of title information, listing to be performed while the relationship between the corresponding metadata file and content file is being confirmed in main memory, and acquisition of the corresponding content file to be carried out using that correspondence in main memory after the user has made a selection.

The above is the series of search processing steps up to display of the desired article contents when the user makes a selection after content is listed.

Next, processing will be described for the case where the user inputs a keyword and content matching that keyword is searched for and displayed. In the example considered here, the user inputs the keyword "Christmas".

The metadata file acquisition section 142 acquires all metadata files recorded on the recording medium 120, and extracts all "Keywords" written in the metadata files. At this time, the correspondence between an extracted keyword and the file number of the metadata file in which it is written is maintained, and a metadata file that has a "Keyword" item matching the keyword input by the user is determined. As shown in FIG. 8, the metadata file with file number "00003" matches this condition.

From this point on, the metadata correspondence resolution section 143 performs processing to obtain from the metadata file with file number "00003" the content file number "00001" corresponding thereto, in exactly the same way as in the processing in Steps 901 to 903 shown in FIG. 10. The content file acquisition section 141 then finally acquires the contents of file "00001.htm" in FIG. 4 comprising an article that matches the user's search condition, and outputs it to the display apparatus 150.

In Steps 901 to 903, processing has been described whereby the file number of a corresponding content file is obtained from the file number of a metadata file, but, conversely, processing whereby the file number of a metadata file is obtained from the file number of a content file can also be implemented in virtually the same way.

As described above, in this embodiment, a package management file for managing correspondence between a package directory number and a package identifier that uniquely identifies that directory, a content file group management file for managing correspondence between the file number of a file name when recorded and a file identifier that uniquely identifies a content file or metadata file, and a content/metadata correspondence management file for managing correspondence between the file identifier of a content file and the file identifier of a metadata file, are created. By using these management files, it is possible always to obtain the correspondence between a content file and metadata file, and to execute accurately and efficiently processing for searching for, categorizing, and organizing content using metadata.

Moreover, not only a one-to-one relationship between content and metadata, but also one-to-multiple, multiple-to-one, and multiple-to-multiple relationships, can be handled, making it possible always to use metadata with a relationship assigned correctly with respect to a set of content.

(Embodiment 2)

Figure 11:
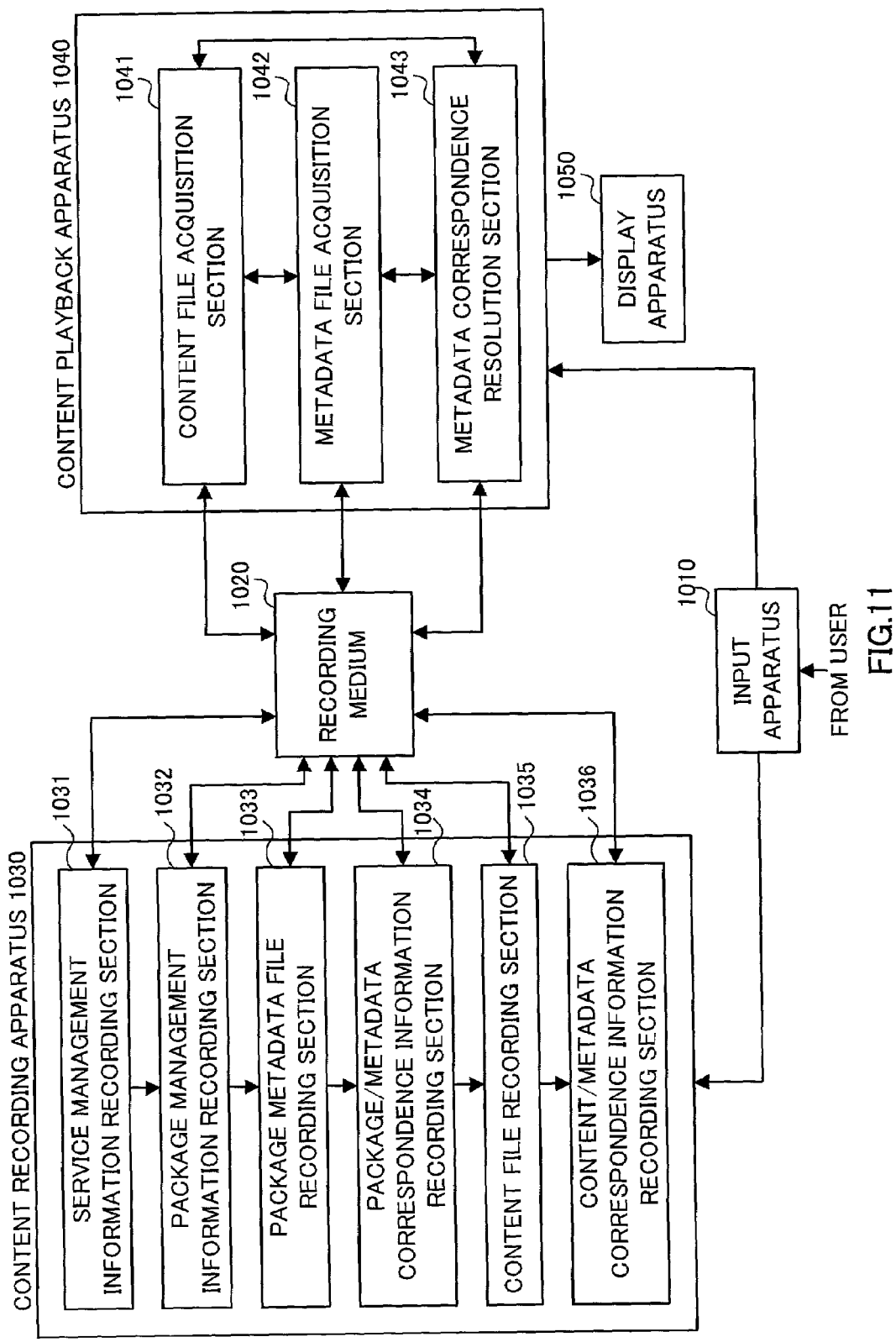
FIG. 11 is a block diagram showing the configuration of a content recording/playback apparatus in Embodiment 2.

FIG. 11 is a block diagram showing the configuration of a content recording/playback apparatus in Embodiment 2 of the present invention. This apparatus chiefly comprises an input apparatus 1010, recording medium 1020, content recording apparatus 1030, content playback apparatus 1040, and display apparatus 1050. The input apparatus 1010 inputs a content recording request from a user to the content recording apparatus 1030, and inputs a content playback request, content search request, or the like, from a user to the content playback apparatus 1040. The content recording apparatus 1030 records package-unit content, metadata, and file management information on the recording medium 1020. Using content and metadata recorded on the recording medium 1020, the content playback apparatus 1040 plays back contents and displays them on the display apparatus 1050, and performs content searching and categorizing.

The content recording apparatus 1030 chiefly comprises a service management information recording section 1031, package management information recording section 1032, package metadata file recording section 1033, package/metadata correspondence information recording section 1034, content file recording section 1035, and content/metadata correspondence information recording section 1036.

The service management information recording section 1031 creates service management information for managing services recorded on the recording medium 1020 and records it on the recording medium 1020. The package management information recording section 1032 creates package management information for managing packages recorded on the recording medium 1020 and records it on the recording medium 1020. The package metadata file recording section 1033 records on the recording medium 1020 a group of metadata files relating to packages contained in individual services or a service itself, and also creates metadata file group management information for managing these file groups and records it on the recording medium 1020. The package/metadata correspondence information recording section 1034 creates information on correspondence between a package within a service and a metadata file, or correspondence between a service itself and a metadata file, and records it on the recording medium 1020. The content file recording section 1035 records on the recording medium 1020 files of a content file group or metadata file group contained in individual packages, and also creates content file group management information for managing these file groups and records it on the recording medium 1020. The content/metadata correspondence information recording section 1036 creates information on correspondence between a content file metadata file within a package, or correspondence between a package itself and a metadata file, and records it on the recording medium 1020.

The content playback apparatus 1040 chiefly comprises a content file acquisition section 1041, metadata file acquisition section 1042, and metadata correspondence resolution section 1043. The content file acquisition section 1041 receives a content playback command, search command, or the like, from the input apparatus 1010, and acquires the specified content file from the recording medium 1020. The metadata file acquisition section 1042 acquires a metadata file necessary for search processing from the recording medium 1020. The metadata correspondence resolution section 1043 performs acquisition of a metadata file corresponding to a specified content file and acquisition of a content file corresponding to a specified metadata file.

Next, content recording processing, content search processing, and content playback processing performed by this apparatus based on the file management method of this embodiment will be described using actual examples.

<Content Recording Processing>

Figure 12:
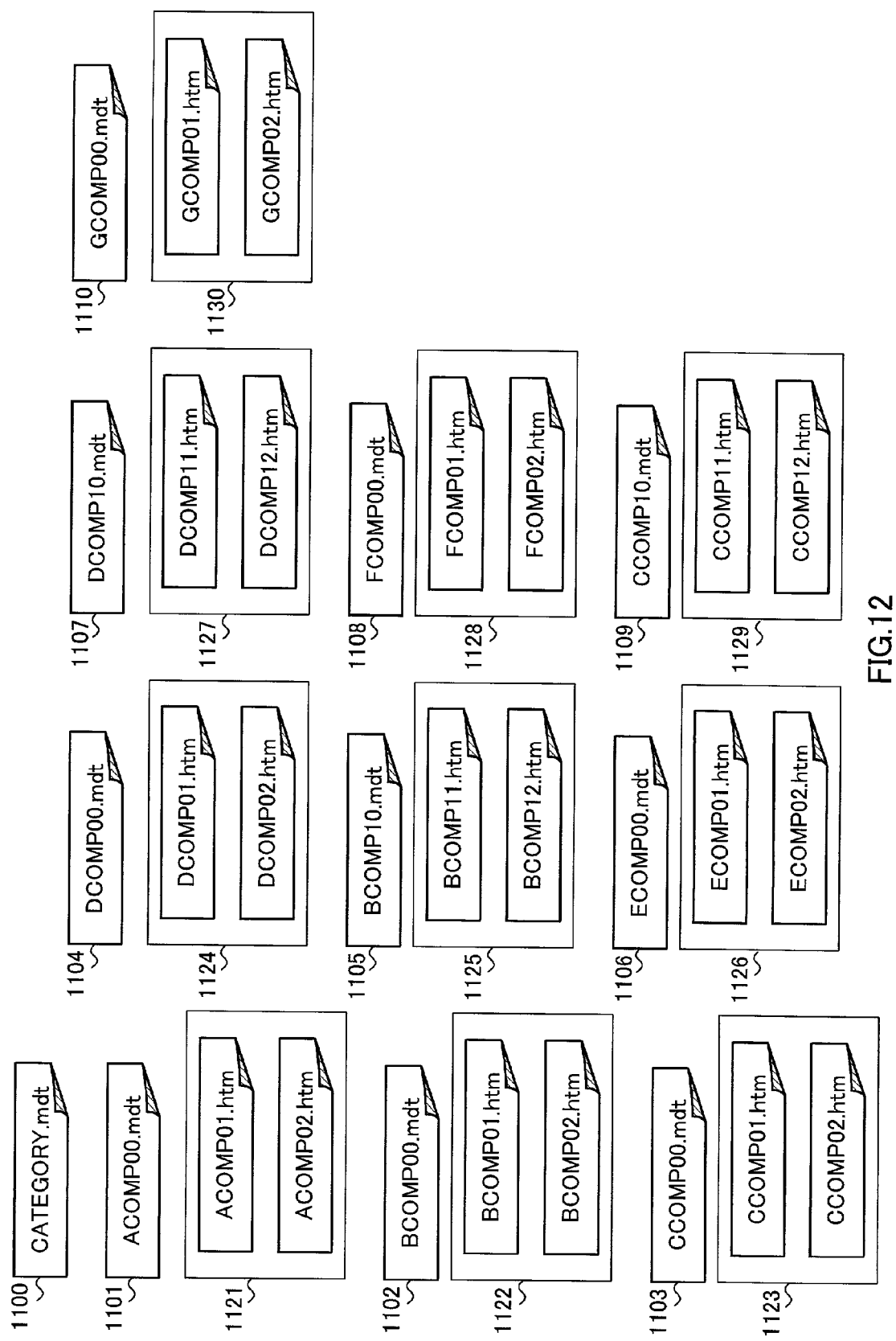
FIG. 12 is a drawing showing an example of packages and metadata files in Embodiment 2.

First, a content recording command is received from the user via the input apparatus 1010. Here, the case where a recording command for metadata 1100 shown in FIG. 12 is issued will be considered as an example. Metadata 1100 has been distributed in advance, prior to the start of the service.

Metadata 1100 in FIG. 12 comprises packages 1121 to 1130 comprising reports each corresponding to a single company, and corresponding metadata files 1101 to 1110. For example, file 1101 is a metadata file corresponding to package 1121, and package 1121, as a report package for Company A, contains files "ACOMP01.htm" and "ACOMP02.htm". A case will be considered in which a total of ten such reports are distributed in succession.

Figure 13:
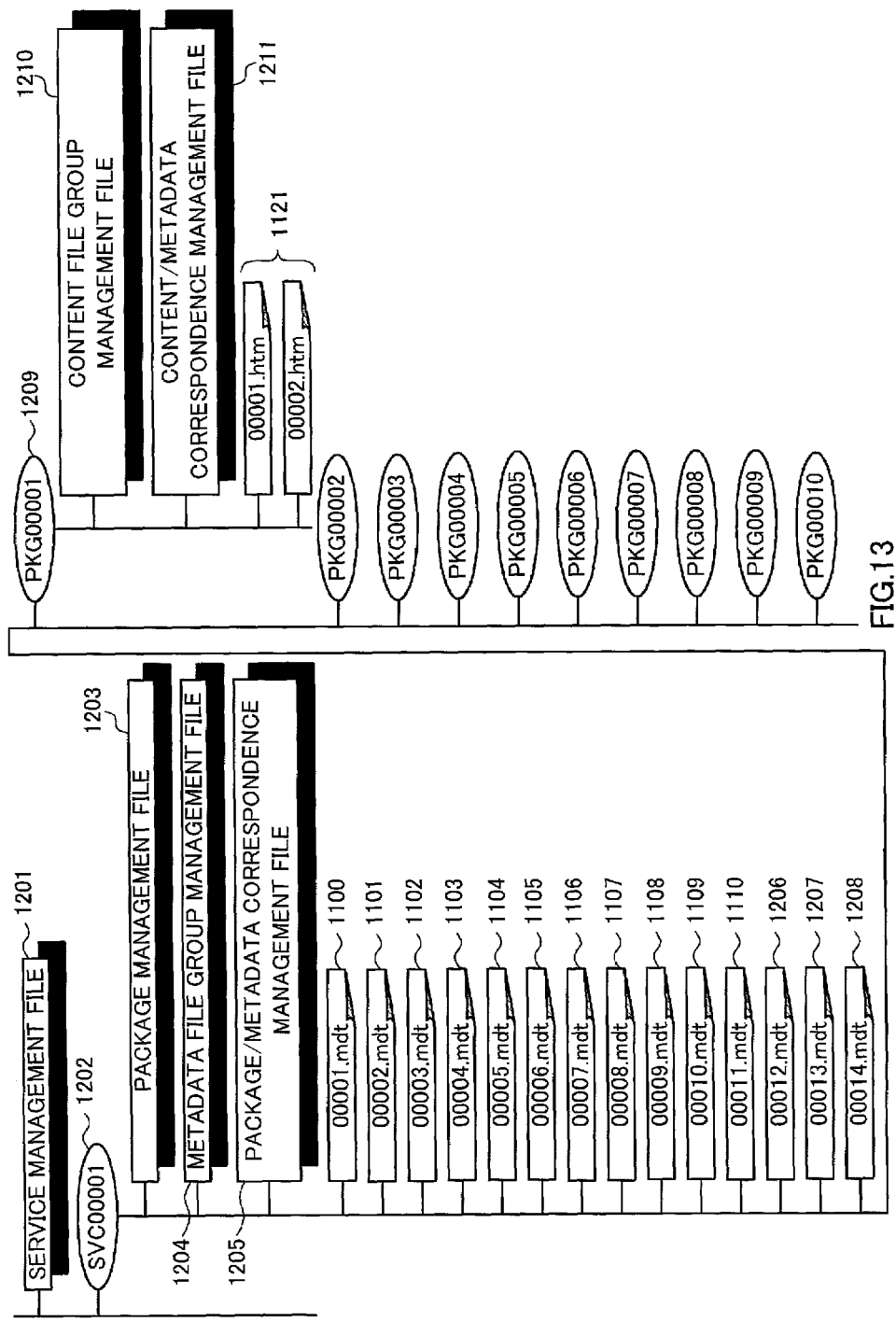
FIG. 13 is a drawing showing directory and file configuration on a recording medium of Embodiment 2.

FIG. 13 is a drawing showing an example of the directory and file configuration on the recording medium 1020 after all the packages shown in FIG. 12 have been recorded by the content recording apparatus 1030.

A service directory 1202 called "SVC00001" indicating a service unit is created at the same level as the service management file 1201, and below this directory 1202 are recorded a package management file 1203, metadata file group management file 1204, package/metadata correspondence management file 1025, and metadata files 1101 to 1110 corresponding to the packages shown in FIG. 12. These are recorded under the file names "00002.mdt", "00003.mdt", "00004.mdt", . . . "00011.mdt", respectively. Similarly, metadata 1100 corresponding to the entire service is recorded under the file name "00001.mdt".

Also, metadata 1206, 1207, and 1208 corresponding to a plurality of packages are created and recorded under the file names "00012.mdt", "00013.mdt", and "00014.mdt". The method of creating these files will be described later herein.

Furthermore, a subdirectory corresponding to each package is created under the service directory 1202, and files contained in each package are recorded under each subdirectory. For example, a directory 1209 called "PKG00001" is created for package 1121 in FIG. 12, and under this directory 1209 are created a content file group management file 1210 and content/metadata correspondence management file 1211, and the files of package 1121.

When the content recording apparatus 1030 receives a content recording command from the input apparatus 1010, it first creates or updates the service management file 1201 by means of the service management information recording section 1031.

In this embodiment, the description is based on a naming rule whereby the directory name of a service directory corresponding to a service directory number is designated "SVCXXXXX (XXXXX=service directory number)", as shown in FIG. 13. It should be understood that any naming rule may be used as long as it derives the directory name of a service directory uniquely from the service directory number.

FIG. 14 is a drawing showing an example of the service management file 1201 at the stage at which the service shown in FIG. 12 is recorded on the recording medium 1020. The service management file 1201 manages the correspondence between a service directory number corresponding to the service directory name and a service identifier for uniquely identifying that directory.

In FIG. 14, the string "COMPREPORT" is used as a service identifier, but as long as this service identifier can uniquely identify a service directory existing on the recording medium 1020, any kind of string, numerals, or symbols may be used.

Package management file 1203 is then created or updated by the package management information recording section 1032. These operations are similar to the operations described in Embodiment 1, and therefore a description is omitted here.

Next, package related metadata file recording and metadata file group management file 1204 creation are performed by the package metadata file recording section 1033.

FIG. 15 is a drawing showing an example of a metadata file group management file 1204 at the stage at which the package shown in FIG. 12 is recorded on the recording medium 1020. A metadata file group management file manages the correspondence between a file number corresponding to a metadata file name when recorded on the recording medium 1020 and a metadata file identifier for uniquely identifying the relevant metadata file, and one metadata file group management file is created for each service directory. Metadata file numbers are assigned on a service-by-service basis.

In this embodiment, the description is based on a naming rule whereby the file name corresponding to a metadata file number is designated "XXXXX.EXT (XXXXX=file number, EXT=original file extension)", as shown in FIG. 13. It should be understood that any naming rule may be used as long as it derives the file name on the recording medium 1020 uniquely from the metadata file number.

Also, in FIG. 13, the distribution source file name string is used as a metadata file identifier, but as long as this file identifier can uniquely identify a file existing under service directory "SVC00001" on the recording medium 1020, any kind of string, numerals, or symbols may be used.

Packages are then recorded on the recording medium 1020. The operations for creation of a content file group management file and content/metadata correspondence management file under a package directory, and content file recording, are similar to the operations described in Embodiment 1, and therefore a description is omitted here.

At this point, metadata files corresponding to metadata file numbers "00012" to "00014" are newly created from distributed metadata. This creation operation is described below.

FIG. 16 is a drawing showing an example of metadata 1100 "CATEGORY.mdt" for the entire distributed service. The contents comprise category information of companies for which reporting is to be performed by a service, within which company category names from main categories Manufacturing/Services/Financial/Construction to base categories Computer/Heavy Electrical/Consumer Electronics are recorded.

FIG. 17 shows an example of the contents of metadata 1101 to 1110 corresponding to the distributed packages. Here, the company name, categories, report date, business results trend (+/−), and so forth, of each package are given.

After recording metadata corresponding to each package, the package metadata file recording section 1033 creates new metadata 1206, 1207, and 1208 by combining these metadata. As an example, the case is shown here where a business results summary for companies belonging to each category is created as metadata.

FIG. 18 is a sample description of contents of metadata 1206, 1207, and 1208. Here, for metadata 1206 a summary for a group of companies categorized as Consumer Electronics is extracted and recorded. Here, for example, the latest business results for companies categorized as Consumer Electronics show four as + and one as −. Similarly, for metadata 1207 a summary for a group of companies categorized as Heavy Electrical is extracted and recorded, and for metadata 1208 a summary for a group of companies categorized as Computer is extracted and recorded.

<Content Search and Playback Processing>

The case will be considered where there is a display content request for a report on companies shown in FIG. 2 via the input apparatus 1010. The user can display a report by directly specifying a company name, etc., but here the case of step-by-step display will be considered, in which a selection menu is first displayed from the apparatus side, and then the user selects an item from that menu to display a detailed report.

The metadata file acquisition section 1042 first acquires a metadata file for the entire relevant service. This is done by means of the following procedure.

First, the metadata correspondence resolution section 1043 references package/metadata correspondence management file 1205 and acquires the metadata file identifier of the relevant service. FIG. 19 shows an example of the contents of a package/metadata correspondence management file.

Here, metadata file identifier "CATEGORY.mdt" corresponding to service identifier "COMREPORT" is acquired. Next, metadata file group management file 1204 is referenced, and metadata file number "00001" corresponding to "CATEGORY.mdt" is acquired.

The metadata file acquisition section 1042 acquires the contents of metadata file "00001.mdt", displays the company categories written therein on the display apparatus 1050, and prompts the user to make a selection.

Assume that the user selects the company category "Computer". In this case, the metadata file acquisition section 1042 acquires metadata files 1206, 1207, and 1208 that contain report summaries, and identifies a "Computer" category summary therefrom. Details of this processing are omitted here. Metadata file 1208 contains a summary of a group of companies categorized as "Computer", and so this summary is displayed on the display apparatus 1050.

Next, assume that the user requests display of a report on a company belonging to that category.

The content playback apparatus 1040 obtains packages corresponding to currently displayed metadata file 1208 as follows.

First, the content playback apparatus 1040 references package/metadata correspondence management file 1205 and finds that there are five package identifiers—"BCOMPPACK00", "BCOMPPACK01", "ECOMPPACK00", "FCOMPPACK00", and "GCOMPPACK00"—corresponding to the currently displayed metadata file.

The content playback apparatus 1040 then references package management file 1203 for each package identifier. FIG. 20 shows an example of the contents of package management file 1203.

For example, the package directory number corresponding to package identifier "BCOMPPACK01" is "00005". The files in this package are then displayed. Display of files in this package is performed in the same way as in Embodiment 1.

In the case of the package/metadata correspondence management file in FIG. 19, one-to-one relationships where one metadata file identifier corresponds to one package identifier, and one-to-multiple relationships where one metadata file identifier corresponds to a plurality of package identifiers, are recorded, but multiple-to-one relationships where a plurality of metadata file identifiers correspond to one package identifier, and multiple-to-multiple relationships where a plurality of metadata file identifiers correspond to a plurality of package identifiers, can also be recorded and managed.

As described above, in this embodiment, in a case where an apparatus that receives content distribution assigns original file names and directory names to distributed content files and metadata files, a directory that records packages, and a directory that records an entire service, the following files are created:

(1) a service management file that manages correspondence between a service directory number corresponding to a service directory name and a service identifier for uniquely identifying that directory, (2) a package management file that manages correspondence between a package directory number corresponding to a package directory name and a package identifier for uniquely identifying that directory, (3) a metadata file group management file that manages correspondence between a metadata file number uniquely corresponding to a file name when a metadata file corresponding to an individual package is recorded on the recording medium 120 and a metadata file identifier for uniquely identifying that metadata file, and (4) a package/metadata correspondence management file that manages correspondence between the file identifier of a metadata file and the package identifier of a package corresponding thereto. By using these management files, it is possible always to obtain the correspondence between various levels of metadata—comprising service related metadata, package related metadata, and content related metadata—and services, packages, and content, and it is possible to execute accurately and efficiently processing for searching for, categorizing, and organizing content and packages using metadata.

Here, the case has been described where metadata files 1206, 1207, and 1208 corresponding to a plurality of packages are created by the content recording apparatus, but these files may also be created on the transmitting side and transmitted.

In above-described Embodiment 1, the case has been described where metadata files are located directly below a package directory, and management is performed as to what each metadata file corresponds to using a content/metadata correspondence management file. And in above-described Embodiment 2, the case has been described where metadata files are located directly below a service directory, and management is performed as to what each metadata item corresponds to using a package/metadata correspondence management file.

However, the above two kinds of correspondence management file may also be files with the same format and the same name (hereinafter both together are referred to as "metadata correspondence management file"). Also, as described above, when a metadata correspondence management file is recorded on the recording medium 120 (1020), the content/metadata correspondence information recording section 133 and package/metadata correspondence information recording section 1034 are together called a metadata correspondence information recording section.

FIG. 21 is a drawing showing an example of the contents of a metadata correspondence management file. A metadata correspondence management file manages correspondence between the identifier of a metadata file and the identifier of an object (generic term for a service, package, or content), and one metadata correspondence management file is created for each service directory or package directory. In the record types shown in FIG. 21, information is recorded for determining whether the relevant metadata correspondence management file is located directly below a service directory or a package directory, and metadata corresponding to what kind of object is comprised by the metadata file specified by the metadata file identifier of the relevant record. FIG. 22 is a drawing showing examples of record types and the meaning of each record type value.

The metadata correspondence information recording section creates a metadata correspondence management file that manages correspondence between a metadata file identifier and the identifier of an object corresponding to that metadata file, and stores it on a recording medium.

In a metadata correspondence management file, in the case of a record with a record type value of "12" or "22", there is specified as being one object to which that metadata file corresponds, so in this case a predetermined value such as Null may be stored as an object identifier value. In FIG. 21 and FIG. 22, record type values "11", "12", "21", and "22" are shown as examples, but as long as the values uniquely specify the fourkinds of meaning shown in FIG. 22, they may be any strings, numerals, or symbols.

As is clear from the above descriptions, with a file management method of the present invention, in a service whereby content and metadata are separately distributed and recorded on a single recording medium the correspondence between content and metadata can be maintained correctly, and it is possible to perform various kinds of processing such as searching, categorizing, and organizing correctly and efficiently using metadata.

When a plurality of services are implemented on a single recording medium, and moreover each service is distributed as a package composed of a plurality of content, it is also possible to maintain correspondence correctly for each level of metadata: service metadata, package metadata, and content metadata.

Furthermore, by enabling one-to-multiple, multiple-to-one, and multiple-to-multiple correspondences to be managed for correspondence between metadata files and packages or metadata files and content files, it is possible to drastically increase the degree of freedom of metadata that can be assigned to a service, and the degree of freedom of processing using metadata, comprising searching, categorizing, and organizing.

Also, as the above-described effects are also achieved in a similar way when an apparatus that receives content distribution assigns original file names and directory names to a distributed content file and metadata file, and a directory that records packages and a directory that records an entire service, similar effects can be provided in an apparatus, such as a portable apparatus, in which processing power is comparatively low and it is necessary to simplify processing by assigning original file names and directory names.

The present invention is not limited to the above described embodiments, and various variations and modifications may be possible without departing from the scope of the present invention.

This application is based on Japanese Patent Application No. 2000-377605 filed on Dec. 12, 2000, entire content of which is expressly incorporated by reference herein.

What is claimed is:

1. A file management method, comprising:
recording on a recording medium and managing a distributed object and a metadata file, the metadata file being an individual file comprising information related to the object and used to retrieve, categorize, and organize the object,
wherein correspondence between an identifier of the metadata file and an identifier of the object corresponding to the metadata file is managed by a metadata correspondence management file;
creating a directory for a package when the object is a package file:
recording, on the basis of the directory, a content file contained in the corresponding package and a metadata file corresponding to the content file;
assigning to the directory a directory name that corresponds to a package directory number assigned uniquely to the package;
managing, with a package management file, correspondence between the package directory number and a package identifier assigned to the package;
assigning to the content file and to the metadata file a name that corresponds to a content number assigned in package units when the content file and the metadata file are recorded on the recording medium;
managing, with a content file group management file, correspondence between the content number and an identifier of the content file or correspondence between the content number and an identifier of the metadata file; and
managing correspondence between an identifier of a content file contained the package and a corresponding identifier of a metadata file, using the metadata correspondence management file.

2. A content recording apparatus, comprising:
a data recorder that records a distributed object and a metadata file on a recording medium, the metadata file being an individual file comprising information related to the object and used to retrieve, categorize, and organize the object; and
a metadata correspondence information recorder that creates and records, on the recording medium, a metadata correspondence management file according to a correspondence between the object and the metadata file;
a service management information recorder that creates a directory corresponding to a service, assigns to the directory a directory name that corresponds to a service directory number uniquely assigned to said service, and creates and records, on the recording medium, a service management file indicating correspondence between the service directory number and a service identifier assigned to the service; and
a package metadata file recorder that assigns a file name to and that records on the recording medium, a metadata file corresponding to a metadata file number uniquely assigned in each service directory, and creates and records on the recording medium, a metadata file group management file indicating correspondence between the metadata file number of the file and an identifier of the file.

3. The content recording apparatus of claim 2, wherein said service management file indicates correspondence between the service directory number and the service identifier assigned to the service when content is distributed in package units in which content is collected.

4. A file management method, comprising:
recording on a recording medium and managing a distributed object and a metadata file, the metadata file being an individual file comprising information related to the object and used to retrieve, categorize, and organize the object, wherein correspondence between an identifier of the metadata file and an identifier of the object corresponding to the metadata file is managed by a metadata correspondence management file;

creating a directory for a service when content is distributed in package units in which related content is collected;

creating, on the basis of the directory, a subdirectory for each package distributed from a related service and recording a metadata file corresponding to the related package;

assigning to the directory a directory name that corresponds to a package directory number uniquely assigned to the package;

managing, with a package management file, correspondence between the package directory number and a package identifier assigned to the package;

recording, on the basis of the subdirectory, a file of content contained in the related package, and a file of metadata corresponding to the related content;

assigning to the content file and to the metadata a file name that corresponds to a content number assigned in package units when the content file and the metadata file are recorded on the recording medium;

managing, with a content file group management file, correspondence between the content number and an identifier of the content file or correspondence between the content number and an identifier of the metadata file;

assigning to the directory a directory name that corresponds to a service directory number uniquely assigned to the service;

managing, with a service management file, correspondence between the service directory number and a service identifier assigned to the service;

assigning to the metadata file, a filename that corresponds to a metadata file number uniquely assigned in each service directory, when the metadata file is recorded on the recording medium;

managing, with a metadata file group management file, correspondence between the metadata file number and an identifier of the metadata file, when the metadata file is recorded on the recording medium; and managing, with the metadata correspondence management file, correspondence between the service identifier and an identifier of the metadata file corresponding to the service identifier, correspondence between an identifier of the package and an identifier of the metadata file corresponding thereto, and correspondence between an identifier of the content file and an identifier of the metadata file corresponding thereto.

5. A content playback apparatus, comprising:

a metadata correspondence resolution device, that, when content is played back from a recording medium on which files of content, distributed from a plurality of services, and file management information are recorded on a directory created for each service, uses the file management information and acquires respective metadata files corresponding to a content file and corresponding to a service, wherein the file management information comprises a service management file that indicates correspondence between a service directory number uniquely corresponding to a directory name of the directory and a service identifier assigned to the service, a metadata file group management file indicating correspondence between a metadata file number uniquely corresponding to a name of a metadata file corresponding to the service and an identifier of the relevant metadata, and, a metadata correspondence management file containing correspondence between an identifier of the service and an identifier of a metadata file corresponding thereto and correspondence between an identifier of a content file and an identifier of a file of metadata corresponding thereto.

6. The content playback apparatus according to claim 5 that, when content is distributed in package units in which related content is collected, using a metadata correspondence management file containing correspondence between an identifier of the package and an identifier of a metadata file corresponding to the package, acquires a metadata file corresponding to the package.

* * * * *